(12) United States Patent
Lestage et al.

(10) Patent No.: US 9,193,515 B2
(45) Date of Patent: Nov. 24, 2015

(54) PACKAGE FOR MICROWAVING DRY FOODS

(75) Inventors: David Lestage, McKinney, TX (US); Joseph Paul Sagel, Plano, TX (US); Susan Tanner, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 118 days.

(21) Appl. No.: 13/605,745

(22) Filed: Sep. 6, 2012

(65) Prior Publication Data
US 2014/0065265 A1 Mar. 6, 2014

(51) Int. Cl.
| | |
|---|---|
| *B65D 81/34* | (2006.01) |
| *B65B 61/20* | (2006.01) |
| *B65B 9/20* | (2012.01) |
| *B32B 7/12* | (2006.01) |
| *B32B 27/10* | (2006.01) |
| *B32B 27/14* | (2006.01) |
| *B32B 27/32* | (2006.01) |

(52) U.S. Cl.
CPC .............. *B65D 81/3461* (2013.01); *B32B 7/12* (2013.01); *B32B 27/10* (2013.01); *B32B 27/14* (2013.01); *B32B 27/32* (2013.01); *B65B 9/20* (2013.01); *B65B 61/202* (2013.01); *B65D 81/3446* (2013.01); *B65D 81/3469* (2013.01); *B32B 2264/101* (2013.01); *B32B 2307/4026* (2013.01); *B32B 2307/726* (2013.01); *B32B 2439/46* (2013.01); *B32B 2439/70* (2013.01); *B65D 2581/3421* (2013.01); *B65D 2581/3428* (2013.01); *B65D 2581/3485* (2013.01)

(58) Field of Classification Search
CPC .... B65D 81/3446–81/3469; B65D 2581/3428; B65D 2581/3485; B65D 2581/34; B32B 27/32; B32B 27/14; B32B 7/12; B32B 27/10; B32B 2264/101; B32B 2439/46; B32B 2439/70; B32B 2307/726; B32B 2307/4026; B65B 9/20; B65B 61/202
USPC ......... 426/107, 109, 112–114, 122–124, 126, 426/127, 234, 237, 87, 394; 428/34.2, 34.3, 428/35.2–35.4; 219/730, 759, 728, 734, 219/744; 383/105, 109, 111, 113, 205, 383/207–209
See application file for complete search history.

(56) References Cited

U.S. PATENT DOCUMENTS

| | | | | | |
|---|---|---|---|---|---|
| 3,854,023 | A | * | 12/1974 | Levinson | 219/730 |
| 4,049,121 | A | * | 9/1977 | White | 206/439 |
| 4,391,833 | A | * | 7/1983 | Self et al. | 426/523 |
| 4,702,963 | A | * | 10/1987 | Phillips et al. | 428/426 |

(Continued)

OTHER PUBLICATIONS

Kirwan M. Paper and Paperboard Packaging Technology [e-book]. Oxford, UK: Blackwell Pub; 2005. Available from: Discovery eBooks, Ipswich, MA. Accessed Aug. 7, 2014.(Chapter 1).*

(Continued)

*Primary Examiner* — Drew Becker
(74) *Attorney, Agent, or Firm* — James R. Gourley; Colin P. Cahoon; Carstens & Cahoon, LLP

(57) ABSTRACT

An improved package for heating dry food products is provided. The present invention allows a dry food product to be heated in a microwave oven. The package has barrier properties and at least a portion of an outer surface that is water absorbent, so that the food package may be wetted prior to being heated in the microwave in order to prevent burning of the food products inside.

6 Claims, 2 Drawing Sheets

(56) References Cited

U.S. PATENT DOCUMENTS

| | | | | |
|---|---|---|---|---|
| 4,716,061 | A * | 12/1987 | Winter | 428/34.3 |
| 4,954,356 | A * | 9/1990 | Kappes | 426/107 |
| 4,987,280 | A * | 1/1991 | Kanafani et al. | 219/731 |
| 5,061,500 | A * | 10/1991 | Mendenhall | 426/118 |
| 5,124,519 | A | 6/1992 | Roy et al. | |
| 5,256,846 | A * | 10/1993 | Walters | 219/729 |
| 5,260,536 | A * | 11/1993 | Peery | 219/730 |
| 5,500,235 | A | 3/1996 | Mendenhall et al. | |
| 5,565,125 | A * | 10/1996 | Parks | 219/759 |
| 6,455,084 | B2 | 9/2002 | Johns | |
| 8,034,740 | B2 | 10/2011 | Kitahata | |
| 2004/0023000 | A1 | 2/2004 | Young et al. | |
| 2006/0049190 | A1 * | 3/2006 | Middleton et al. | 219/730 |
| 2006/0096978 | A1 * | 5/2006 | Lafferty et al. | 219/730 |
| 2006/0113300 | A1 | 6/2006 | Wnek et al. | |
| 2007/0029314 | A1 * | 2/2007 | Rodgers et al. | 219/730 |
| 2007/0275130 | A1 * | 11/2007 | Cole et al. | 426/107 |
| 2009/0004433 | A1 | 1/2009 | Privitera et al. | |
| 2009/0041908 | A1 | 2/2009 | Canham | |
| 2009/0230126 | A1 * | 9/2009 | Fitzwater | 219/730 |
| 2010/0012652 | A1 * | 1/2010 | Cole | 219/730 |
| 2010/0065555 | A1 | 3/2010 | Lonergan | |
| 2010/0098814 | A1 | 4/2010 | Frascarelli | |
| 2010/0111453 | A1 * | 5/2010 | Dierl | 383/204 |
| 2010/0221391 | A1 | 9/2010 | Deng | |
| 2013/0087556 | A1 | 4/2013 | Birchmeier et al. | |
| 2014/0113036 | A1 * | 4/2014 | Erle | 426/107 |

OTHER PUBLICATIONS

PCT International Search Report and Written Opinion for PCT/US2013/58562, mailed Jan. 15, 2014.

"Flexibowl" available at http://www.ampaconline.eu/product-innovations/flexibowl.html (1 page).

"Package combines MAP film with steam cooking valve" available at http://www.foodproductiondaily.com/Packaging/Package-combines-MAP-film-with-steam-cooking-valve (3 pages).

* cited by examiner

PACKAGE FOR MICROWAVING DRY FOODS

BACKGROUND OF THE INVENTION

1. Technical Field

The present invention relates to a food package that facilitates microwave heating of the contents of the package.

2. Description of Related Art

The design and construction of packaging for containers of consumables, such as potato chips, tortilla chips, corn chips or other snack food products, involves consideration of application-specific criteria. For example, many such snack food products are packaged in "pillow" type packages made from flexible packaging film. When the snack food product is relatively dry, a packaging material that provides a high barrier to moisture migration is typically used.

It is also desirable to consume some food products at temperatures above room temperature. This is frequently the case when a food that has been cooked is being consumed. Ideally, a consumer wants to eat the food shortly after it has been prepared so it is still warm. Sometimes, however, the "leftovers" from meals are preserved at low temperature in a container stored inside a refrigerator. The leftovers are then heated in a microwave, on a stove, inside a hot air oven, or other known heating method, shortly before they are consumed. Similarly, many examples of commercially available refrigerated and frozen foods exist in the marketplace, which are also heated shortly before consumption.

In the case of relatively dry food products, cooking and packaging technology enables market participants to store and sell dry food products for weeks or months at room temperature after they have been cooked, before they lose their desirable organoleptic properties, become stale, or become microbially unstable. Such products are known in the industry as shelf stable food products. Shelf stable food products are typically relatively dry—less than 3% moisture—and have been cooked at temperatures above 100° C. to kill any pathogens present in the ingredients. Examples include, snack chips such as potato chips, tortilla chips, fruit chips and vegetable chips, as well as extruded puffs, pretzels and many other cooked, dry food products.

Much like non-shelf-stable foods, shelf stable food products typically have a highly desirable taste. Some restaurants serve warm tortilla chips that have been fried in-house as an appetizer. Dry snack products that are produced commercially are also known to have a highly desirable flavor when sampled shortly after coming off of a product line. However, the prior art fails to disclose a food package that facilitates the heating of a relatively dry food. Consequently, a need exists for a package of food that allows a consumer to easily heat and consume the dry food products inside.

SUMMARY OF THE INVENTION

The proposed invention comprises a package for food products and a method that allows relatively dry food products to be heated using microwave energy. In one embodiment, a food package comprises a microwave-safe barrier layer and an outer surface, wherein at least a portion of said outer surface is water absorbent.

In another embodiment, the portion of said outer surface comprises a label affixed to said food package. The portion may be capable of absorbing between about 0.5 grams and 1.5 grams of water per 28 grams of food products inside said food package, or more preferably about 1 gram of water per 28 grams of food products inside said food package. In one embodiment, the outer surface comprises a water absorbent layer partially covered by a polymer layer.

In another embodiment, the water absorbent portion comprises a wetness indicator. In another embodiment, the outer surface comprises a paper layer. In still another embodiment, said water absorbent portion comprises water.

In one embodiment, the package further comprises at least one score line. In another embodiment, the score line lies underneath said label. In still another embodiment, the label comprises a microwave-safe barrier layer.

In another embodiment, a method of making a food package comprises providing a flexible film comprising a microwave-safe barrier layer and an outer layer, wherein at least a portion of said outer layer is water absorbent; feeding said flexible film into a form, fill, and seal machine; forming said flexible film into a tube having a bottom; sealing said flexible film at the bottom of said tube, thereby forming a bottom seal on a resultant package; filling said resultant package with food product; and sealing and cutting a top of said resultant package.

In one embodiment the providing step comprises applying a water absorbent layer to said flexible film. The applying step may occur before said feeding, during said feeding or said forming, or after said sealing.

The invention is simple and inexpensive to manufacture, provides adequate protection for the product contained therein, and is easy to use for the consumer. The container is an improvement over the prior art in the packaging efficiencies and functional use by the consumer. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
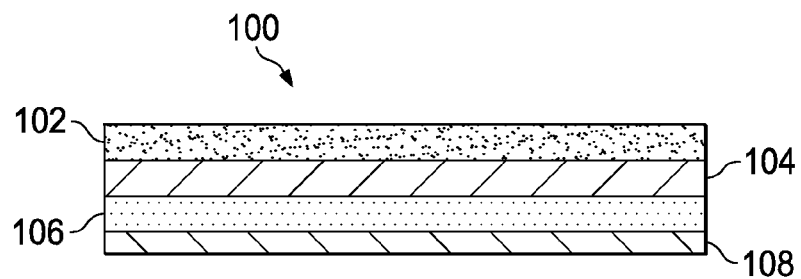
FIG. 1 is a cross sectional view of a multi-layered film that can be used in one embodiment the food package of the present invention.

Crispy snack food products, such as tortilla chips, potato chips, corn chips, fruit and vegetable chips, crackers and pretzels, are typically consumed at room temperature because they are sold to consumers in individual single serving or multiple serving packages from convenience stores or grocery stores long after the snacks have been cooked. However, some restaurants offer these snack food products to consumers fresh from the cooking medium, and thus still hot. Other restaurants offer the snack items warm to consumers by temporarily storing them under warming lamps or the like. The term "crispy food product" as used herein is defined as a food product comprising less than 3% moisture by weight. The term "product" as used herein is includes a single product, a group of products, or a mixture of products.

One goal of the present invention is to provide consumers the ability to easily and efficiently replicate the restaurant experience of eating hot crispy foods using products purchased at grocery or convenience stores. The present invention is also directed towards a method of heating food products using microwave energy, preferably in a microwave oven.

The microwave oven is an appliance that can be found in many homes and businesses. During operation, a microwave oven floods the cooking chamber with non-ionizing microwave radiation, usually at a frequency of about 2.45 GHz. Another commonly used microwave frequency is 915 MHz. The power level of most consumer grade microwaves varies from about 900 Watts to about 1400 Watts.

Many food molecules (for example water molecules) are electric dipoles, which means they are positively charged at one end and a negatively charged at the other end. As the microwave radiation passes through the food, the dipole molecules rotate as they try to align themselves with the alternating electric field of the microwaves. This rotation and movement causes the food to heat up as the rotating molecules impact other molecules, putting them into motion. Microwave heating is highly efficient on liquid water (which a relatively polar molecule), and much less so on fats and sugars (which are less polar).

The microwave radiation can be produced by a cavity magnetron, and directed into the food chamber through a waveguide. The waveguide in most small, consumer grade microwaves directs the microwave radiation into the food chamber from one side of the food chamber, usually at a location between the middle and the top of the food chamber. The microwave radiation generally reflects off the walls of the food chamber, but is absorbed by any water bearing food present in the food chamber, thereby exciting the water molecules. The radiation reflecting around inside the food chamber forms an approximately uniform heating environment, with some localized hotspots due to constructive and/or destructive interference between microwaves.

Most food products that contain water can be heated effectively in a microwave oven. However, because the activity and efficiency of the microwave heating largely depends on the amount of water present in the food being heated by microwave energy, foods containing different levels of water heat at different rates when separately heated in the same microwave. For example, in the context of the present invention, heating about two ounces of a crispy food product, such as tortilla chips, alone inside a microwave will badly burn the chips after about 30 seconds to about 75 seconds, depending on the power level of the microwave. By contrast, a cup of salsa heated in the same microwave for the same time period may merely become warm to the touch. Also, any sharp corners or sharp edges on crispy food products, such as the corners on triangular shaped tortilla chips, burn more readily under microwave heating than other parts of the food product.

Applicants herein have created a food package that enables a consumer to heat crispy food in the microwave without burning the food product. In one embodiment, the package is a microwave-safe package that comprises an outer surface, wherein at least a portion of the outer surface is water absorbent. When the water absorbent surface has been wetted and the package is placed into the microwave and heated, the water on the surface of the package acts as an additional load in the microwave, absorbing some of the microwave energy so the crispy food products are exposed to a reduced amount of microwave energy and heat more slowly and evenly. There are a number of embodiments of this invention which fall within the scope of the invention in its broadest sense.

In one embodiment, the package is made from a multi-layered packaging film that comprises a water absorbent layer as the outermost layer. FIG. 1 depicts a cross section of a multi-layered film 100 that comprises a water absorbent outer layer 102. In a preferred embodiment, the water absorbent layer 102 is a water absorbent cellulose-based layer such as a paper layer. In one embodiment, substantially all of the outer surface of the food package is water absorbent. In another embodiment, only a portion of the outer surface of the food package is water absorbent.

The film depicted in FIG. 1 also comprises an adhesive layer 104, a barrier layer 106, and a product side layer 108. The film may include other layers, such as a barrier adhesion layer (not shown) between the barrier layer 106 and the product side layer 108, as determined by a practitioner of the present invention. The adhesive layer, product side layer, and any other polymer layers may be made of any polymer, polymer resin, or combination of polymers or resins, which is known in the art to be microwave-safe, including petroleum-based polymer such as polyethylene and bio-based polymers such as polylactic acid polymers.

In order for the food package to be microwave-safe, the barrier layer must be made of a material that will not cause arcing when heated inside a microwave. Generally, metallic barrier layers will cause arcing. Therefore, a typical vapor-deposited aluminum barrier layer, or an aluminum foil layer, will not work with the present invention. Preferred examples of barrier layers that are microwave-safe are metal oxide or metalloid oxide layers, including, without limitation, silicon dioxide and titanium dioxide, as well as aluminum oxide. In a preferred embodiment, the barrier layer provides a moisture vapor transmission rate of less than 3 g/m2/day and more preferably less than 0.2 g/m2/day, in either case measured at 100° F. and 90% relative humidity.

As used herein, a nanocoating comprises a nanoclay, a nanocomposite or nanocomposite coating and any necessary binder. Nanocomposites are described in U.S. Pat. No. 7,223,359. In one embodiment, the composite film comprises a nanocoating or nanoclay layer to provide barrier properties. Nanoclays in accordance with the present invention comprise layered silicate platelets such as vermiculite, aluminosilicates, zeolites, bentonite, montmorillonite, kaolinite, bauxite, nontronite, beidellite, volkonskoite, hectorite, sponite, laponite, sauconite, hydrous mica, chlorite, magadiite, kenyaite, ledikite and mixtures thereof. Multiple polymer matrices known in the art can be used as a binder to "glue" the nanoclay or nanocomposite constituents together including, but not limited to an acrylic emulsion, styrene-acrylics, and polyurethanes.

In one embodiment of the present invention, the film depicted in FIG. 1 is fed into a known vertical form, fill, seal machine, and used to create a "pillow" or "pouch" food package. When substantially the entire outer surface of such a package comprises a water absorbent layer, the package may appear to an observer no different than a prior art food package. However, the functionality of such a food package will differ significantly from known food packages. As described above, the outer surface can be wetted by the consumer, and the wetted package can be heated in the microwave to provide the consumer with a heated food product that is not burned.

In other embodiments, only a portion of the outer surface of a food package is water absorbent. Providing only a portion of the outer surface as water absorbent may be preferable in order to prevent the consumer from over-wetting the surface, and thereby using a supplemental load that is too high to allow the food products inside the package to heat in a reasonable time, or heat consistently, inside the microwave. In a preferred embodiment, the percentage of the outer surface that is water absorbent is chosen such that when substantially all of the water absorbent portion is wetted by the consumer, the food package can be microwave heated for a known period of time to consistently, effectively and efficiently heat the food products inside.

The physical dimensions of the water absorbent portion of the package will depend on the water absorbent capacity of the water absorbent portion. Generally, Applicants have found that when relatively dry or crispy food products are heated in a microwave, a water absorbent portion that can absorb between about 0.5 grams and 1.5 grams of water per about 28 grams of food products inside the food package provides an adequate supplemental load to prevent burning of the food products during heating. In a preferred embodiment, the water absorbent portion can absorb about 1 gram of water per about 28 grams of food products inside the food package. Relatively dry food products include, without limitation, crispy food products, shelf-stable snack foods, snack chips, potato chips, fruit chips, vegetable chips, tortilla chips, pretzels, popcorn, crackers, extruded puffs, fabricated chips and corn chips. Embodiments of the present invention will also work with confectionaries, candies, cookies, and other food products that people desire to consume at temperatures above the temperature at which they are sold or stored.

There are many different ways a practitioner of the present invention can provide a food package wherein only a portion of its outer surface is water absorbent. One method of providing a package with a portion of its outer surface as water absorbent is to apply a water absorbent layer to the outer surface of a known package. In one embodiment, the water absorbent layer is part of an adhesive label or strip comprising a water absorbent surface. A water absorbent label may be applied to the outer surface of a prior art package after the package is formed, or to a surface of a polymer film before or during manufacture of the package such that the label will be affixed to the outer surface of the package.

In another embodiment, the water absorbent label or layer further comprises water. In this embodiment, a food package is manufactured with the additional water load built into the food package, such that the consumer is not required to separately wet the water absorbent portion of the food package. This embodiment may provide additional convenience to the consumer, and greater control by the manufacturer over the amount of water provided in the water absorbent portion so that effective and efficient microwave heating of the product inside the food package can occur.

Figure 2:
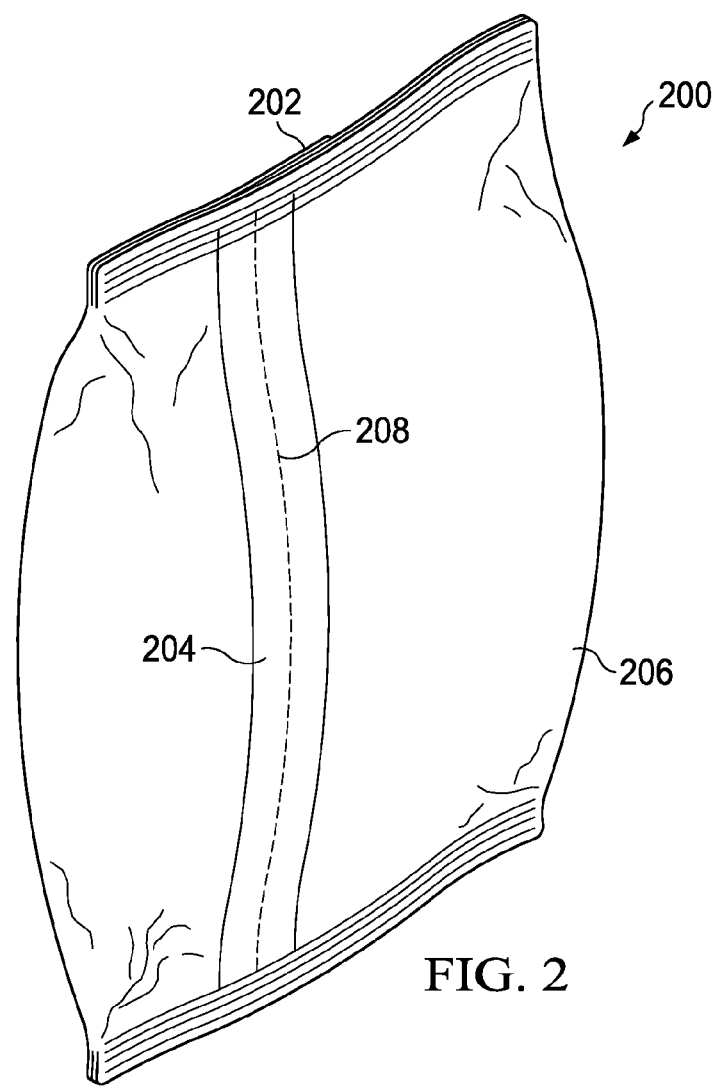
FIG. 2 is a perspective view illustrating one embodiment the food package of the present invention.

FIG. 2 depicts one embodiment of a food package 200 with a water absorbent adhesive label 204 affixed to its outer surface 206. Although depicted on the side of the package 200 opposite the back seal 202 (typically referred to as the "front" of the package), the water absorbent label 204 is preferably applied to the side of the package that contains back seal 202 because the side of the package opposite the seal 202 typically contains a product logo and graphics which are used to convey information to the consumer, and the water absorbent layer might obscure the logo and graphics. Alternatively, logo and graphics on the front of the package can be arranged such that they incorporate, and perhaps even reference, the water absorbent label.

The food package 200 shown in FIG. 2 also depicts an optional score line 208. The package 200 is scored by cutting a groove into the packaging film that does not penetrate all layers of the film. The packaging film may be scored before, during or after it has been made into a package. In one embodiment, the package is scored on an outer surface, and in another embodiment, the package is scored on an inner surface. In either case, the barrier properties of the film may be disrupted. If the barrier properties of the film are disrupted, the water absorbent label can comprise a microwave-safe barrier layer and be placed over the score line, so the label restores the overall barrier properties of the package when it is applied over the score line.

In a preferred embodiment, the water absorbent label is removable. A removable or peelable label may be provided by using an adhesive to adhere the label to the food package which is a lower strength adhesive than the other adhesives used to make the multi-layered film(s) used for the food package and/or label. Providing a food package with a score line underneath a removable water absorbent label has the technical effect of providing the consumer with a way to heat the contents of a food package in a microwave, as described above, remove the water absorbent label, and then easily open the food package at the score line to transform the package into a bowl that provides easy access to the contents. In some instances, the score line may already be breached when the food package is removed from the microwave due to expansion of the gas or steam generation inside the food package.

In another embodiment, the water absorbent label comprises a wetness indicator that changes color when the label is wet. Any suitable substance can be used to provide this functionality. In one embodiment, a chemical that changes color based on its interaction with water, such as cobalt (II) chloride which changes from blue to pink as it absorbs water, is included as a part of the water absorbent label. In another embodiment, a dye or pigment encapsulated in a water soluble casing is included as a part of the water absorbent label. In this embodiment, water used to wet the label will dissolve the casing and allow the dye or pigment to distribute through the water absorbent portion of the label.

Figure 3:
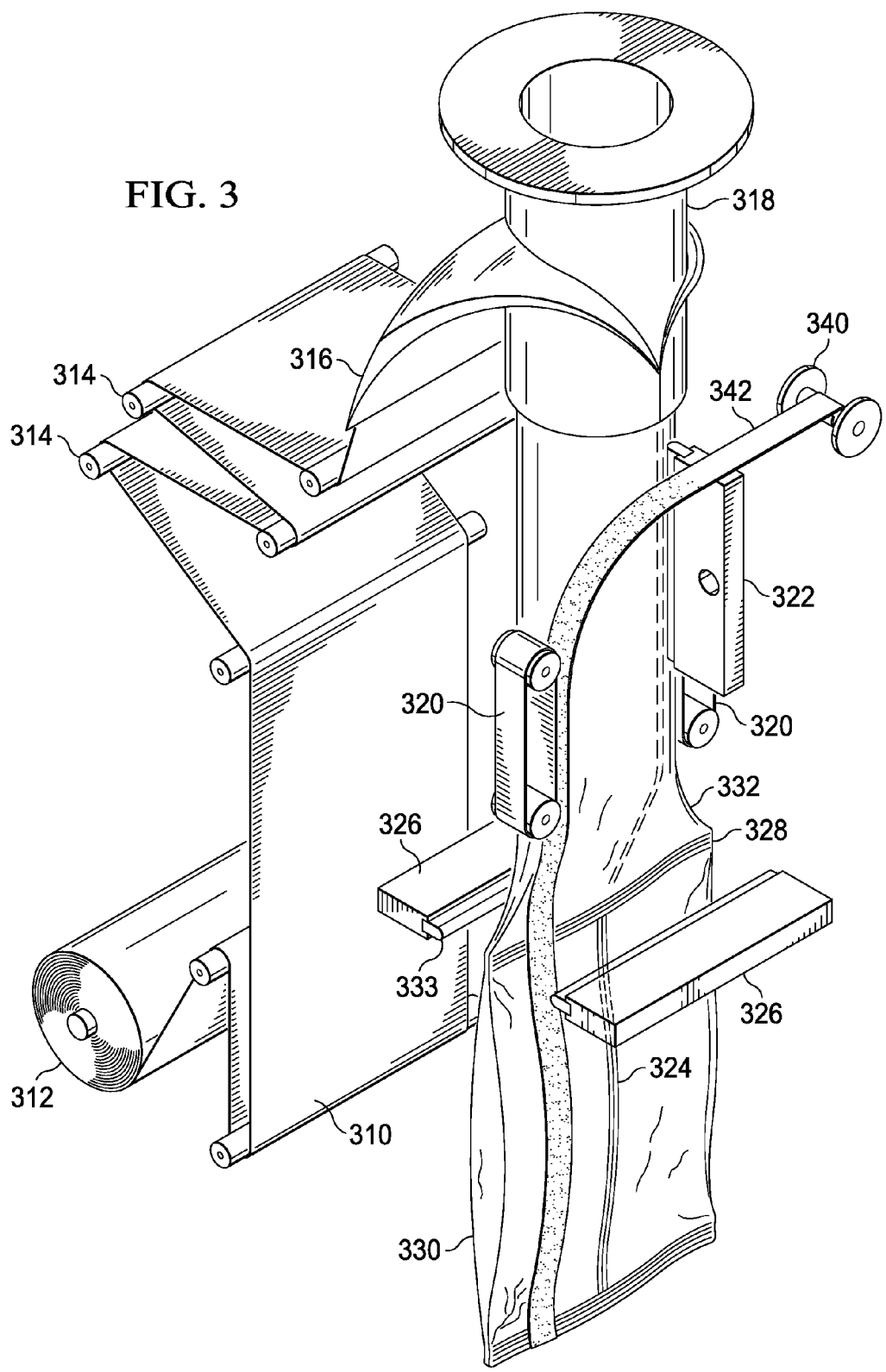
FIG. 3 is a perspective view of one embodiment of a method of making food packages according to the present invention.

FIG. 3 depicts one embodiment of an apparatus used to apply a water absorbent adhesive label strip to a flexible food package. Therein is depicted a vertical form fill seal machine. A roll 312 of polymer film 310 is passed through a number of tension bars 314, over a collar 316 and around fill tube 318. Rollers 320 advance the film 310 down the tube, and seal bar 322 forms a fin or lap seal 324 on the polymer film sheet 310. At the same time, a spool 340 of water absorbent adhesive strip 342 is continuously applied to the polymer film sheet 310. The means for applying the adhesive strip 342 to the polymer film sheet 310 is not shown so the adhesive strip is not obstructed in this view. However, such means can comprise a roller similar to the roller 320, or a pressure or heat seal bar similar to the seal bar 322. The application means can be heated if a heat-activated adhesive is used on the water absorbent adhesive strip, or can merely provide pressure if a pressure-sensitive adhesive is used. As the polymer film with water absorbent strip attached advances down the vertical form fill seal machine, product is dropped through fill tube 318 to the bottom 332 of the package being formed, and heat seal bars 326 seal 328 and cut 333 the polymer film sheet into packages 330.

In other embodiments, the water absorbent strip is applied to the polymer film sheet before it enters the vertical form fill seal machine. In these embodiments, it may be easier to relocate the strip on the film. Although the strip would be applied running in the machine direction, the location of the strip relative to each side of the film sheet can be varied by simply moving the application equipment laterally across the width of the film sheet, rather than moving the equipment circumferentially around the film tube. In other embodiments, individual water absorbent labels are placed onto the polymer film or food package before, during or after manufacture of the food package.

Another method of providing a food package with an outer surface having a portion that is water absorbent is to manufacture a food package wherein substantially the entire outer surface is water absorbent (for example, using the film depicted in FIG. 1), but then coat a portion of the outer surface with a substance that renders it substantially water impermeable. For example, a package with an outer layer comprising paper can be partially coated with a polymer layer that does not allow penetration of water through to the paper layer. Other methods of manufacturing a food package with an outer surface, wherein a portion of the outer surface is water absorbent, are within the scope of this invention.

While the invention has been particularly shown and described with reference to a preferred embodiment, it will be understood by those skilled in the art that various changes in form and detail may be made therein without departing from the spirit and scope of the invention.

What is claimed is:

1. A food package comprising: a microwave-safe barrier layer, wherein said barrier layer provides a moisture vapor transmission rate of less than 3 g/m2/day when measured at 100° F. and 90% relative humidity, between an outer surface, wherein only a portion of said outer surface is water absorbent and has a water absorbent capacity of between about 0.5 grams and 1.5 grams of water per 28 grams of food products inside said food package, wherein said portion of said outer surface which is water absorbent comprises a label affixed to said food package, and a product side layer, further wherein said food products inside said food package comprise at least one of snack chips, potato chips, fruit chips, vegetable chips, tortilla chips, pretzels, popcorn, crackers, extruded puffs, fabricated chips and corn chips.

2. The package of claim 1 wherein said portion comprises a wetness indicator.

3. The package of claim 1 wherein said outer surface comprises a paper layer.

4. The package of claim 1 further comprising at least one score line.

5. The package of claim 4 wherein said score line lies underneath said label.

6. The package of claim 1 wherein said label comprises a microwave-safe barrier layer, wherein said barrier layer provides a moisture vapor transmission rate of less than 3 g/m2/day when measured at 100° F. and 90% relative humidity.

* * * * *